United States Patent [19]

Castner

[11] Patent Number: 4,736,005
[45] Date of Patent: Apr. 5, 1988

[54] INJECTION WATER VISCOSIFIER FOR ENHANCED OIL RECOVERY

[75] Inventor: Kenneth F. Castner, Uniontown, Ohio

[73] Assignee: The Goodyear Tire & Rubber Company, Akron, Ohio

[21] Appl. No.: 737,622

[22] Filed: May 24, 1985

Related U.S. Application Data

[63] Continuation-in-part of Ser. No. 378,154, May 14, 1982, Pat. No. 4,526,947.

[51] Int. Cl.⁴ .................. C08F 220/58; C08F 220/54
[52] U.S. Cl. ............................ 526/229; 526/274; 526/240; 526/304; 526/303.1
[58] Field of Search ............ 526/240, 303.1, 173, 526/229, 234, 209, 210, 207, 304

[56] References Cited

U.S. PATENT DOCUMENTS

| | | | |
|---|---|---|---|
| 3,509,113 | 4/1970 | Monogle et al. | 526/287 |
| 3,779,917 | 12/1975 | Norton et al. | 526/287 |
| 3,959,552 | 5/1976 | Heins et al. | 526/304 |
| 4,076,928 | 2/1978 | Gross | 526/304 |
| 4,154,910 | 5/1979 | Tanaka et al. | 524/813 |
| 4,473,689 | 9/1984 | Login et al. | 526/303.1 |

FOREIGN PATENT DOCUMENTS 2352353 4/1975 Fed. Rep. of Germany ... 526/303.1

Primary Examiner—Joseph L. Schofer
Assistant Examiner—Peter F. Kulkosky
Attorney, Agent, or Firm—Alvin T. Rockhill

[57] ABSTRACT

High molecular weight N,N-dimethylacrylamide copolymers and terpolymers were synthesized. These polymers offer outstanding advantages as injection water viscosifiers in enhanced oil recovery processes including chemical, miscible, and steam or in processes requiring profile improvement through adsorption and/or gelation. They are very valuable in applications where high salinity is a problem since they are relatively insensitive to metal salts (such as those containing polyvalent ions, such as $Ca^{++}$ and $Mg^{++}$.).

27 Claims, No Drawings

INJECTION WATER VISCOSIFIER FOR ENHANCED OIL RECOVERY

This application is a continuation-in-part of Ser. No. 378,154, filed on May 14, 1982 (now issued U.S. Pat. No. 4,526,947).

BACKGROUND OF THE INVENTION

After using conventional pumping techniques very large amounts of oil in a given reservoir remain unrecovered. In an attempt to recover this vast quantity of unpumped petroleum many enhanced oil recovery (EOR) techniques have been developed. The water flooding method is a very common EOR technique that has been in use for some time. Water flooding is a secondary oil recovery technique that is chiefly of importance when the natural production of a well has ceased—that is, when petroleum can no longer be pumped from the well economically using conventional pumping techniques. The term "secondary recovery," as used herein, refers to all petroleum recovery operations used in such areas when spontaneous production of the well can no longer be effected. It includes what is sometimes known in the industry as "tertiary recovery," which is a later stage which begins when the petroleum reservoir is substantially "flooded out" and a large amount of water may be produced before any oil is recovered. Thus, primary recovery is when a well spontaneously flows using conventional pumping techniques and secondary recovery begins when primary recovery is no longer feasible and continues for as long as there is any petroleum in the well which can be economically or feasibly removed.

The water flooding technique comprises injecting water into a petroleum deposit through at least one input well, thereby causing the petroleum to flow from that area for collection through at least one output well. In the simplest recovery method a number of wells are drilled on the circumference of a circle and a final well is drilled in the center. Water is then pumped into one or more of the wells, typically the ones on the circumference (sometimes referred to herein as "injection wells"), under high pressure and forced through the petroleum-bearing formations, usually porous rock strata. The petroleum remaining in the strata is forced out by the oncoming water and removed through the output well, usually the one at the center of the circle. More typically an array of injection and production (output) wells are established over an oil field in a manner that will optimize this secondary recovery technique by taking into account the geological aspects of that particular field.

Ideally, the water should displace 100 percent of the petroleum in the oil field. Even though water may pass through a deposit, the inherent incompatibility of oil and water, variation in reservoir rock, including permeability variation, faults and shale barriers may result in some regions of the reservoir rock being by-passed so that large oil bearing areas in the deposit remain untouched. This results in less than 100 percent of the residual oil in the reservoir being recovered. The ability of water, or any other fluid, to displace oil is related to that fluids mobility ratio. Every fluid has a specific mobility in an oil deposit, which can be defined as the ease with which that fluid flows through a porous medium divided by the viscosity of that fluid. A mobility ratio is the ratio of the mobility of two fluids; for example, oil and water. If a fluid flows much more easily than oil through a reservoir, it will readily bypass oil deposits within the reservoir rather than pushing them toward producing wells. Thus, fluids with low mobility ratios are greatly preferred for enhanced oil recovery applications. Recovery by water flooding techniques is greatly facilitated if the mobility of the petroleum relative to the injection water is at a maximum. This is frequently accomplished by increasing the viscosity of the aqueous medium and decreasing the viscosity of the petroleum by the addition of suitable chemical agents. Thus, a thickener is ordinarily added to the water while a thinning agent may be charged into the petroleum.

High molecular weight (above about 1,000,000) water soluble polymers are generally added to the injection water used in EOR applications to improve the mobility ratio of the water to the oil. A very large increase in water viscosity can be obtained when certain polymers are added in minor amounts (100 ppm to 1500 ppm). Two general types of polymers are currently being used for this application, they are polyacrylamides and polysaccharides. In general, partially hydrolyzed and anionic polyacrylamides are used, but cationic polyacrylamides have also been used in a limited number of cases. The mobility ratio improvement obtained using polyacrylamides decreases with water salinity and divalent ion concentration. Therefore, a fresh water source (total dissolved solids less than 10,000 ppm) has traditionally been necessary for the effective use of polyacrylamides in EOR applications as viscosifiers. The environment into which the polyacrylamide solution is injected must also be substantially free of salts in order to be effective.

SUMMARY OF THE INVENTION

Poly-N,N-dimethylacrylamide (poly-DMA) is nonionic which makes it insensitive to metal salts.

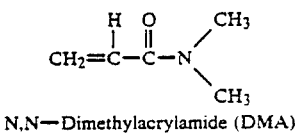

N,N—Dimethylacrylamide (DMA)

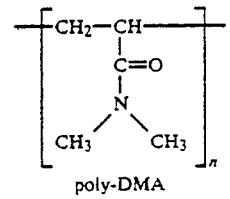

poly-DMA

Traditionally, low molecular weight has prevented poly-DMA synthesized by utilizing conventional techniques from providing the high viscosity required for EOR applications. This invention presents a technique for the synthesis of ultra-high molecular weight DMA copolymers (polymers containing chain linkages (repeat units) derived from DMA monomer). These high molecular weight DMA copolymers have excellent properties as viscosifiers for EOR applications. This technique utilizes a copolymerization of N,N-dimethylacrylamide monomer (DMA) with sodium styrene sulfonate monomer (SSS) or N-methylolacrylamide monomer (NMA).

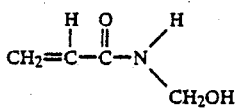

Sodium Styrene Sulfonate (SSS)   N—Methylolacrylamide (NMA)

An ammonium persulfate/sodium metabisulfite redox initiator system can be utilized in this polymerization. This copolymerization produces a polymer with a much higher molecular weight than can be synthesized using DMA monomer alone.

This invention discloses a method for recovering petroleum from a subterranean petroleum bearing deposit which comprises injecting viscous water into the area of said deposit through at least one input well, thereby causing said petroleum to flow from said area for collection through at least one output well, the improvement which comprises injecting said viscous water containing a water soluble polymer with chain linkages derived from N,N-dimethylacrylamide and at least one member selected from the group consisting of N-methylolacrylamide and sodium styrene sulfonate into the area of said deposit; a method for recovering petroleum from a subterranean petroleum bearing deposit which comprises injecting viscous water into the area of said deposit through at least one input well, thereby causing said petroleum to flow from said area for collection through at least one output well, the improvement which comprises injecting said viscous water containing a water soluble polymer with chain linkages derived from N,N-dimethylacrylamide, at least one member selected from the group consisting of N-methylolacrylamide and sodium styrene sulfonate, and at least one member selected from the group consisting of sodium 2-acrylamido-2-methyl-propanesulfonate, potassium 2-acrylamido-2-methylpropane-sulfonate, ammonium 2-acrylamido-2-methylpropanesulfonate, and calcium 2-acrylamido-2-methylpropanesulfonate into the area of said deposit: a process for the synthesis of a high molecular weight polymer which comprises: the addition of a metal persulfate and at least one member selected from the group consisting of sodium metabisulfite, sodium thiosulfate and sodium dithionite to an aqueous reaction solution consisting of N,N-dimethylacrylamide and at least one member selected from the group consisting of N-methylolacrylamide and sodium styrene sulfonate, in amounts and under conditions sufficient to initiate the polymerization; a process for the synthesis of a high molecular weight polymer which comprises: the addition of a metal persulfate and at least one member selected from the group consisting of sodium metabisulfite, sodium thiosulfate and sodium dithionite to an aqueous reaction solution consisting of N,N-dimethylacrylamide, at least one member selected from the group consisting of N-methylolacrylamide and sodium styrene sulfonate, and at least one member selected from the group consisting of sodium 2-acrylamido-2-methylpropanesulfonate, potassium 2-acrylamido-2-methylpropanesulfonate, ammonium 2-acrylamido-2-methylpropanesulfonate, and calcium 2-acrylamido-2-methylpropanesulfonate in amounts and under conditions sufficient to initiate the polymerization: a process for the synthesis of a high molecular weight polymer which comprises: the addition of a metal persulfate and at least one member selected from the group consisting of sodium metabisulfite, sodium thiosulfite, and sodium dithionite to a reaction solution comprising water, an oil, dispersing agent, N,N-dimethylacrylamide, and at least one member selected from the group consisting of N-methylolacrylamide and sodium styrene sulfonate in amounts and under conditions sufficient to initiate the polymerization: an aqueous polymer solution comprising: water and a high molecular weight polymer with chain linkages derived from N,N-dimethylacrylamide and at least one member selected from the group consisting of N-methylolacrylamide and sodium styrene sulfonate; and a high molecular weight water soluble polymer comprised of chain linkages derived from N,N-dimethylacrylamide and at least one member selected from the group consisting of N-methylolacrylamide and sodium styrene sulfonate.

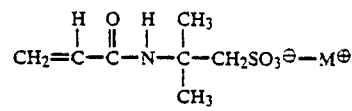

Metal 2-acrylamido-2-methylpropanesulfonate
(M = Na, K, NH$_4$)

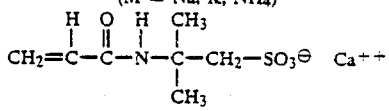

Calcium 2-acrylamido-2-methylpropanesulfonate

DETAILED DESCRIPTION

An ultra-high molecular weight copolymer of DMA and SSS can be synthesized in an aqueous medium over a very wide temperature range. The monomer charge concentration used in an aqueous solution synthesis of DMA/SSS copolymers can be varied over a wide range from as low as about 2 weight percent to as high as about 50 weight percent of the total reaction solution (monomers, water, initiators, etc.). Generally, it is preferred to use a monomer charge concentration (total concentration of all monomers in the aqueous reaction solution) in the range of 10 to 20 weight percent. For example, 80 parts of water, 19.8 parts of DMA and 0.02 part of SSS (20 weight percent monomer charge concentration) can be employed in the polymerization recipe utilized in the synthesis of ultra-high molecular weight copolymers of DMA and SSS. In DMA/SSS copolymerizations SSS monomer charge level ranging from about 0.1 to about 5 weight percent based upon total monomers used in the reaction solution can be employed. Good results have been obtained using an SSS monomer charge level from about 0.5 to about 1.5 weight percent based upon total monomers. Excellent results have been obtained by utilizing a total monomer concentration of about 20 weight percent (the total concentration of all monomers in the reaction solution) in these aqueous copolymerizations.

Ultra-high molecular weight DMA/NMA copolymers can be synthesized utilizing a reaction solution comprising DMA, NMA, redox initiators and water. The DMA/NMA monomer charge concentration used in this aqueous polymerization can vary over a wide range from as low as about 2 percent to as high as about 50 weight percent of the total reaction solution. Generally, it will be preferred to utilize a monomer charge concentration ranging from 10 to 20 weight percent of the total reaction solution. The charge level of NMA used in such a polymerization recipe can range from as low as about 0.1 weight percent to as high as about 5 weight percent based upon total monomers in the reaction solution. Very good results have been obtained and it will be generally preferred to use a charge level of NMA ranging from about 1 to 3 weight percent based upon total monomers. For example, a reaction solution comprising 80 parts of water, 19.4 parts of DMA, and 0.6 parts of NMA will produce very good results on polymerization (NMA charge level of 3 percent by weight based upon total monomer).

These polymerizations that yield ultra-high molecular weight DMA/SSS and DMA/NMA copolymers can generally be initiated by utilizing free radical initiators: for example redox initiator systems, such as metal persulfate and metabisulfite. Potassium persulfate and ammonium persulfate have been used with great success as redox initiators when used in conjunction with sodium metabisulfite. Various metal persulfates (for example sodium and potassium) and ammonium persulfate (hereinafter the term metal persulfates will be meant to include ammonium persulfate) can be employed as redox initiators when used in conjunction with sodium metabisulfate, sodium thiosulfate, and sodium dithionite. These redox initiator components can be employed at levels from about 0.01 to about 0.1 phm (parts per hundred parts monomer). An initiator level of 0.0375 phm ammonium persulfate and 0.0375 phm sodium metabisulfite has been employed very successfully to initiate polymerizations of this type. A number of other initiator systems can also be employed. For example, a metal persulfate used alone at elevated temperatures can initiate the polymerization of DMA copolymers (DMA/SSS copolymers and DMA/NMA copolymers).

The temperature range at which these polymerizations can be run is from about 5° C. to about 50° C. The preferred temperature range is from 15° C. to 25° C., with good results being obtained at a temperature of 20° C. The reaction time allowed for the polymerization to occur (time period between the initiation of the polymerization and its termination) is generally in the range of about 6 to 18 hours. This reaction time can vary with the temperature of the polymerization and the initiator types and concentration utilized.

Generally, it is desirable to remove dissolved oxygen from these aqueous solutions before polymerization. This can be accomplished by sparging the solution with an inert gas or nitrogen before initiating the polymerization. It may also be desirable to maintain such a sparging with an inert gas or nitrogen during the initial stages of the polymerization.

These aqueous polymerizations which yield ultra-high molecular weight DMA/SSS and DMA/NMA copolymers result in the formation of a water soluble gel-like mass. This water soluble polymer must be dissolved in additional water in order to be utilized as a viscosifier for EOR applications. These polymers should be dissolved in an appropriate amount of water to provide a polymer concentration that will result in the desired viscosity for the injection water. Obviously the viscosity of the injection water increases with increasing polymer concentrations. Generally it will be desirable to have an injection water viscosity (Brookfield) of about 2 to about 30 cps (centipoise) for EOR applications.

When preparing these solutions care should be taken so as to prevent shear forces from causing molecular fracture in the polymer chains of these copolymers. In order to prevent molecular fracture when dissolving these polymers in water, vigorously mixing, shaking, etc. should generally be avoided. The occurrence of such molecular fracture induced by shearing forces can significantly reduce the molecular weight of the polymer and therefore its usefulness as an EOR viscosifier (viscosities would be reduced). In order to dissolve these polymers in water they must be allowed to dissolve over a very long period of time. These ultra-high molecular weight DMA copolymers are very valuable as EOR injection water viscosifiers because they are transparent to salts (the viscosity of their aqueous solutions is unaffected by salt).

Ultra-high molecular weight terpolymers of DMA, NMA or SSS and metal salts or 2-acrylamido-2-methylpropane sulfonic acid (AMS) are very useful as viscosifiers for EOR applications. Terpolymers of this type have very high viscosity in fresh water and also maintain excellent viscosities in saline solution. Sodium AMS (sodium 2-acrylamido-2-methylpropanesulfonate), potassium AMS (potassium 2-acrylamido-2-methylpropanesulfonate), ammonium AMS (ammonium 2-acrylamido-2-methylpropane-sulfonate) and calcium AMS (calcium 2-acrylamido-2-methylpropanesulfonate) have all been found to be useful as monomers in the synthesis of these ultra-high molecular weight terpolymers. The DMA charge level used in the synthesis of a terpolymer of this type can range from about 30 percent to as high as 95 weight percent of the total monomer charge. The NMA monomer charge level used in the synthesis of these DMA terpolymers can range between about 0.1 weight percent to as high as about 10 weight percent of the total monomer charge. The amount of metal-AMS useful in these terpolymer polymerizations can range from as low as about 4 weight percent to as high as 50 weight percent of the total monomer charge. The amount of NMA monomer needed in this polymerization decreases with increasing levels of DMA monomer used in the polymerization. The monomer charge concentration can be varied from 2 to 50 weight percent of the total reaction solution. A monomer charge concentration from 10 to 20 percent by weight is preferred. The optimum percentage of the various monomers used in this terpolymer polymerization varies with temperature, the total monomer charge concentration, and initiator levels.

The initiators useful in this DMA terpolymer polymerization are the same as the initiators that were disclosed for use in DMA copolymer synthesis. The initiator concentration that can be used for this terpolymer polymerization ranges from as low as 0.01 phm to as high as about 0.05 phm. The preferred initiator concentration range is from 0.02 phm to 0.04 phm. A redox initiator system comprising 0.0375 phm of ammonium persulfate and 0.0375 phm of sodium metabisulfate has been used with great success in this terpolymer polymerization. Normally, the redox initiator used to initiate the polymerization is added as 0.5 weight percent aqueous solution.

The temperature range at which this polymerization can be run also varies over a wide range from as low as about 5° C. to as high as about 50° C. The preferred temperature range is again from 15° C. to 25° C.

As was the case for DMA copolymer polymerization it is normally advantageous to remove dissolved oxygen from the aqueous charge composition. This can be accomplished by sparging the aqueous polymerization recipe with an inert gas (e.g., nitrogen or helium): employing oxygen scavengers (e.g., sodium dithionite): or degassing with a vacuum. The preferred monomer charge composition recipe used in this terpolymer polymerization is 40 to 50 weight percent DMA, 0.1 to 10 weight percent NMA, and 40 to 50 weight percent metal-AMS. After this polymerization is completed, which normally takes 6 to 18 hours, the product is in the form of a gel-like mass. Yields in such aqueous polymerizations are essentially quantitative (in excess of 99 percent). The percentage of chain linkages by weight derived from a monomer in a polymer will be equal to the percentage by weight of that monomer in the monomer charge used in the synthesis of that polymer. This material must be dissolved in the amount of water required to provide the desired viscosity for the injection water used in EOR applications. As was the case with DMA copolymers, care must be taken to prevent molecular fracture in this terpolymer by shear degradation. This would result in the loss of viscosity for the injection water being treated per unit weight of this DMA terpolymer used. As was the case with DMA copolymers it takes long time periods to dissolve this DMA terpolymer in injection water since severe shearing forces must be avoided (for example, vigorous mixing, stirring, shaking, etc.). The viscosity of the injection water being treated can be controlled by dissolving the required amount of this DMA terpolymer in the water. The DMA terpolymer from this polymerization has an ultra-high molecular weight and will increase the viscosity of fresh water very dramatically. This DMA terpolymer is affected by saline solutions, but still retains excellent viscosity in salt water. This terpolymer of DMA, NMA and metal-AMS is an excellent choice as a general purpose viscosifier for EOR applications.

These DMA copolymers and terpolymers can also be synthesized by utilizing a water-in-oil dispersion polymerization. The ultra-high molecular weight polymers produced by water-in-oil dispersion polymerization are in the form of a liquid (in contrast to the gel-like mass formed in aqueous polymerizations). This liquid can easily be further diluted to the desired polymer concentration for use as injection water for EOR applications. This further dilution can be achieved almost immediately upon mixing with additional water. The ultimate properties of these DMA copolymers and terpolymers produced by water-in-oil dispersion polymerizations are equivalent to the properties of their counterparts produced by aqueous polymerization (they have the same excellent properties as EOR viscosifiers). Water-in-oil dispersion polymerization offers a very substantial advantage over aqueous polymerization in that the ultra-high molecular weight polymers produced can be easily and rapidly dissolved (further diluted) in the injection water.

The water-in-oil dispersion synthesis of DMA/SSS copolymers, DMA/NMA copolymers, DMA/SSS/metal-AMS, and DMA/NMA/metal-AMS terpolymers is run utilizing the same monomer charge composition, activators, and reaction conditions as is used in the aqueous polymerization synthesis of these ultra-high molecular weight polymers. In water-in-oil dispersion polymerization, in addition to the reagents used in aqueous polymerization, there is also present an oil and a dispersing agent. Some representative examples of oils that can be used are kerosene, diesel fuel, pentane, hexane, decane, pentadecane, benzene, toluene, 2,4-dimethylhexane, mineral oil (liquid petrolatum), and 3-ethyloctane. This is certainly not an exhaustive list of the oils that can be employed. Most alkanes containing 5 or more carbon atoms will work very well as will most aromatic hydrocarbons. Alkenes should not be used since they can react in the polymerization. The dispersing agents are nonionic surfactants that are soluble in hydrocarbons and insoluble in water. Some representative examples of dispersing agents that may be used in water-in-oil dispersion polymerization include polyethers, such as Igepal CO-430 ™ (GAF Corp.); polyglycerol oleates, such as Witconol-14 ™ (Witco Chemical Company) and polyglycerol stearates, such as Witconol-18L ™ (Witco Chemical Company) and mixtures of these agents.

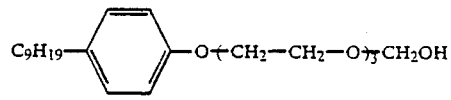

Igepal CO-430 ™

These dispersing agents (nonionic surfactants) are added to the oil that will be used in the water-in-oil dispersion polymerization. Normally, the oil used in such dispersion polymerizations will contain from about 2 to about 20 weight percent of the dispersing agent. Normally, the charge composition used in these water-in-oil dispersion polymerizations will contain 25 weight percent of the oil containing the dispersing agent in relation to the total reaction solution. Even more oil can be used in such water-in-oil dispersion polymerization with a corresponding increase in the amount of dispersing agent used but generally it will not be advantageous to use larger amounts of the oil. Good results have been obtained using a reaction mixture comprising about 25 weight percent monomers, about 50 weight percent water, and about 25 weight percent oil. A charge composition containing less than 25 weight percent monomers can be used, however, it will not be advantageous to use lesser quantities of the monomers.

It is often desirable to use deionized water in such charge compositions. Oxygen which is dissolved in the monomers, water, and oil should be removed before polymerization. This can be accomplished by sparging the monomers, water, and oil with an inert gas or nitrogen. Such a mixture of monomers, water, and oil is vigorously mixed to obtain the water-in-oil dispersion. The dispersion is brought to the desired temperature (normally ambient temperature about 20° C.) and the initiator components are added. The addition of ammonium persulfate followed by sodium metabisulfite has been used with good success as an initiator. The reaction mixture containing the initiator is normally stirred during the course of the polymerization.

After the desired reaction time the polymerization can be terminated by adding a shortstopping agent, such as methylether hydroquinone. Normally, this reaction time will be from about 6 to about 18 hours. The desired reaction time will vary with reaction temperature, initiator concentration, and the degree of polymerization desired. Normally, it will be desirable to allow the polymerization to go to completion (until the monomer supply is essentially exhausted). In such water-in-oil dispersion polymerizations yields are essentially quantitative (in excess of 99 percent). The percentage of chain linkages by weight derived from a monomer in a polymer will be equal to the percentage by weight of that monomer in the monomer charge used in the synthesis of that polymer.

The performance of these enhanced oil recovery polymers as injection water viscosifiers is determined partly by their molecular weight. It is necessary for these polymers to have a high molecular weight (typically, 1,000,000 or greater) to be effective in EOR applications. Determinations of molecular weight are therefore an important aspect in the characterization procedure of polymeric EOR injection water viscosifiers. Low angle laser light scattering is a technique that can be used to determine the weight average molecular weight of these polymers. A review of light scattering procedures is presented in Jordan, R. C., "Size Exclusion Chromatography With Low Angle Laser Light Scattering Detection," *Journal of Liquid Chromatography*, Vol. 3, No. 3, pp. 439–463 (1980); Tanford, Charles, *Physical Chemistry of Macromolecules* (N.Y., John Wiley & Sons, Inc. 1961) pp. 275–316 and pp. 390–412; Huglin, M. B., *Light Scattering From Polymer Solutions* (N.Y., Academic Press, 1972) pp. 165–203, 291, and 306–331. All of the foregoing references are hereby incorporated by reference in their entirety.

One analytical method which can be used to determine weight average molecular weight is as follows: solutions of dimethylacrylamide/sodium styrene sulfonate copolymers (DMA/SSS) were prepared by accurately weighing 0.3–0.5 grams of polymer in a tared 100 milliliter volumetric flask. About 75 milliliters of distilled water was added to each of 4 flasks and six days were allowed for dissolution. The polymer solutions in the flasks were then further diluted to volume (100 ml) with distilled water. All other sample concentrations used in the light scattering procedure were volumetrically prepared from these solutions. Specific refractive index increments were measured on a Brice-Phoenix differential refractrometer equipped with a mercury vapor light source and band pass filters of 633, 546 and 436 nm (nanometers). Calibration was accomplished with potassium chloride solutions. Low angle laser light scattering measurements were performed with a Chromatix KMX-6 low angle laser light scattering photometer, after filtering the solutions through a 1.2 micron filter. All sample scattering was measured using the 6°–7° annulus and 0.2 mm field stop. The KMX-6 laser has a wavelength of 633 nm.

The weight average molecular weights of various DMA/SSS copolymers as determined by this procedure are given in Table I. These copolymers differ in the percent by weight of sodium styrene sulfonate based upon total monomers in the reaction solution used in their synthesis. The Brookfield viscosities of these DMA/SSS copolymers were also determined using the technique described in Example 3.

TABLE I

| Weight Average Molecular Weight of DMA/SSS Copolymers | | |
|---|---|---|
| % SSS | Brookfield Viscosity | Molecular Weight |
| 0.23 | 3.8 | 1,760,000 |
| 0.40 | 4.4 | 1,830,000 |
| 0.60 | 5.4 | 2,960,000 |
| 0.80 | 6.8 | 3,590,000 |

All of these DMA/SSS copolymers have a high molecular weight (in excess of 1,000,000). As can be determined by examining Table I, molecular weight increases with increasing Brookfield viscosities. Various DMA/SSS and DMA/NMA copolymers have been synthesized that exhibit much greater Brookfield viscosities than those cited in this example and their molecular weights would therefore be greater than those determined above.

Nuclear magnetic resonance (n.m.r.) spectroscopy was used to confirm the incorporation of chain linkages derived from N,N-dimethylacrylamide and N-methylolacrylamide into DMA/NMA copolymers. These copolymers with chain linkages derived from DMA and NMA can be represented by the formula:

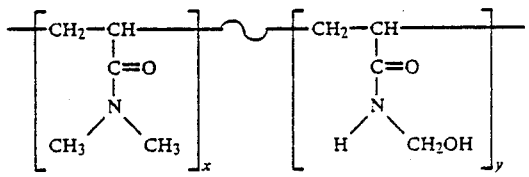

wherein x and y are integers and wherein

—⌒— indicates that the distribution of chain linkages derived from DMA and NMA in the polymer chain is random. Nuclear magnetic resonance spectroscopy was also used to confirm the incorporation of chain linkages derived from N,N-dimethylacrylamide, N-methylolacrylamide, and sodium-2-acrylamido-2-methyl-propanesulfonate into DMA/NMA/Na-AMS terpolymers which can be represented by the formula:

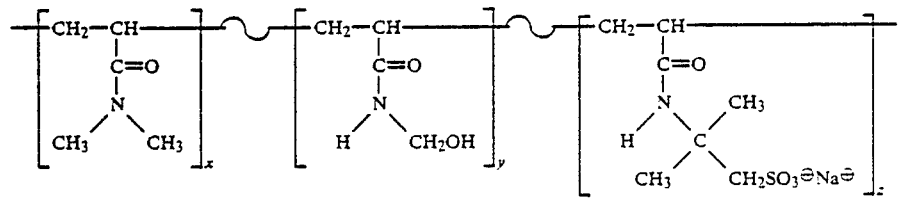

wherein x, y and z are integers and wherein

—⌒— indicates that the distribution of chain linkages derived from DMA, NMA, and Na-AMS in the polymer chain is random.

The DMA/NMA copolymer and DMA/NMA/Na-AMS terpolymer samples used in this n.m.r. analysis were synthesized in the 10 mm n.m.r sample tubes used by adding known amounts of each monomer or its aqueous solution (see Table II) to the tubes, diluting with D₂O until the total weight of each solution was 2.5 grams, and adding the initiators to polymerize the samples. The polymerized samples were run on a 20 MHz ¹³C probe with a gated wide band 'H decoupling sequence. The other instrument settings were as follows: sweep width 5000 Hz, acquisition time 0.5 second, pulse delay 4.5 seconds, and pulse width 12 microseconds.

Table II shows the various components used in the reaction solutions utilized in the synthesis of these polymers. In each of these samples the polymerization was initiated by the addition of 0.030 mls. of a 1% aqueous solution of (NH₄)₂S₂O₈ and 0.030 mls. of a 1% aqueous solution of Na₂S₂O₅. Table II also shows the percentage of each of the monomers (based on total monomers) employed in the reaction solutions. The total amount of chain linkages by weight derived from each of the various monomers which has been incorporated into the polymers is also shown in column 3 of Table II.

TABLE II

| Monomer Components | % Monomer in Reaction Solution | % of Chain Linkages Derived From Monomers |
|---|---|---|
| 0.50 g DMA | 100% DMA | 100% DMA |
| 0.50 g Na—AMS | 100% Na—AMS | 100% Na—AMS |
| 0.20 g NMA | 100% NMA | 100% NMA |
| 0.50 g DMA/0.0124 g NMA | 97.6% DMA, 2.4% NMA | 97.2% DMA, 2.8% NMA |
| 0.25 g DMA/0.25 g Na—AMS/0.025 g NMA | 47.6% DMA, NMA, 47.6% Na—AMS | 47.6% DMA, 3.6% NMA, 48.8% Na—AMS |

The percentage of chain linkages derived from each of these monomers (as shown in column 3) was determined by using this n.m.r. technique. As can be determined by comparing the percentage of a given monomer in the reaction solution and the percentage of chain linkages derived from that monomer in the polymer synthesized, the percentage of chain linkages by weight derived from a monomer in a polymer is essentially equal to the percentage by weight of that monomer in the reaction solution (based upon total monomers) used in the synthesis of that polymer. These polymerizations have yields which are essentially quantitative with all of the monomers in the reaction solution being polymerized into the polymers. The three homopolymers were run as standards and to determine the chemical shift for the chain linkages derived from each of these monomers.

DMA/SSS copolymers which have chain linkages derived from N,N-dimethylacrylamide and sodium styrene sulfonate can be represented by the formula:

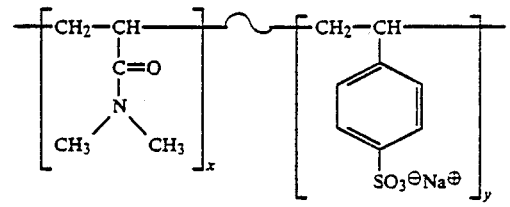

wherein x and y are integers and wherein

indicates that the distribution of chain linkages derived from DMA and SSS in the polymer chain is random. DMA/SSS/Na-AMS terpolymers which have chain linkages derived from N,N-dimethylacrylamide, sodium styrene sulfonate, and sodium 2-acrylamido-2-methylpropane sulfonate can be represented by the formula:

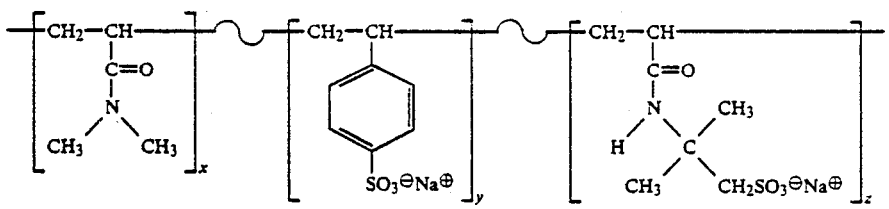

wherein x, y, and z are integers and wherein

indicates that the distribution of chain linkages derived from DMA, SSS, and Na-AMS in the polymer chain is random.

Terpolymers which have chain linkages derived from DMA, NMA, and SSS are also useful as viscosifiers for EOR applications and can be represented by the formula:

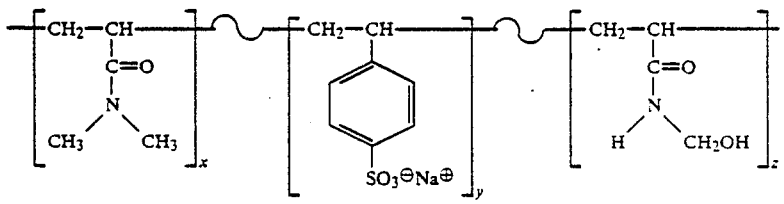

wherein x, y, and z are integers and wherein

indicates that the distribution of chain link derived from DMA, NMA, and SSS in the polymer chain is random. Polymers that have chain linkages derived from DMA, NMA, SSS and Na-AMS are also useful as EOR injection water viscosifiers and can be represented by the formula:

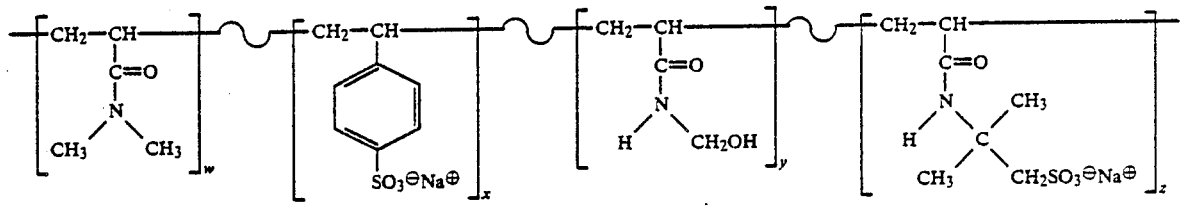

wherein w, x, y, and z are integers and wherein

∽ indicates that the distribution of chain linkages derived from DMA, NMA, SSS, and Na-AMS in the polymer chain is random. Other metal-AMS, such as K-AMS, NH4-AMS, and Ca-AMS are also useful as monomers from which chain linkages can be derived to form polymers that are useful for EOR applications.

Acrylamide has been copolymerized with DMA and NMA to form a terpolymer that is useful for EOR applications. It has chain linkages derived from acrylamide, DMA, and NMA which can be represented by the formula:

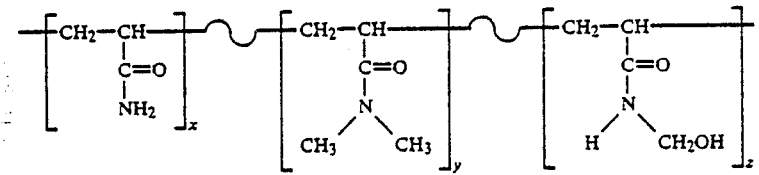

wherein x, y, and z are integers and wherein

∽ indicates that the distribution of chain linkages derived from DMA, NMA, and acrylamide is random. Such terpolymers containing chain linkages derived from acrylamide are inferior to DMA/NMA copolymers since the acrylamide group can be readily hydrolyzed, yielding a product which is not transparent to salts. The greater the amount of chain linkages derived from acrylamide incorporated into such a terpolymer, the more likely it will be sensitive to salts. However, for cost considerations it may be advantageous to copolymerize a small amount of acrylamide into EOR polymers (producing polymers containing chain linkages derived from acrylamide) notwithstanding the fact that they will become more sensitive to salts. Acrylamide can also be copolymerized to form DMA/SSS/acrylamide terpolymers, DMA/NMA/SSS/acrylamide copolymers, DMA/NMA/metal-AMS/acrylamide copolymers DMA/SSS/metal-AMS/acrylamide copolymers, and DMA/NMA/SSS/metal-AMS/acrylamide copolymers which are useful as EOR injection water viscosifiers, but upon hydrolysis of the acrylamide linkage they will become more sensitive to salts. The high molecular weight water soluble polymers of this invention are derived from a major amount of DMA (at least 30 weight percent of their chain linkages derived from DMA).

The polymerizations that have herein been described utilize various monomers to form polymers containing chain linkages (repeat units) derived from these monomers. These chain linkages differ from the monomers that they were derived from in that they no longer contain a carbon-carbon double bond (see the preceding formulae for these polymers).

DESCRIPTION OF THE PREFERRED EMBODIMENTS

This invention is illustrated by the following examples.

EXAMPLE 1

DMA and SSS were added to deionized water to give a monomer concentration of 10 weight percent. This solution contained 9.9 percent DMA and 0.1 percent SSS. The solution was thoroughly nitrogen sparged to remove any dissolved oxygen. 100 milliliters of this solution was added to a 4 ounce polymerization bottle. While continuing to nitrogen sparge this solution, 0.0375 phm of ammonium persulfate was added in the form of a 0.5 percent aqueous solution and 0.0375 phm parts of sodium metabisulfite was added in the form of a 0.5 percent aqueous solution. This solution was well mixed and the polymerization bottle was capped and allowed to stand in a constant temperature bath at 20° C. for 18 hours. This technique resulted in the synthesis of an ultra-high molecular weight copolymer of DMA and SSS which had a gel-like consistency. This ultra-high molecular weight DMA copolymer is only slightly ionic in character and therefore is relatively insensitive to saline solutions. It is an excellent choice as an EOR viscosifier in applications where salt in the injection water environment traditionally have reduced the viscosity of ionic polymer solutions.

EXAMPLE 2

A 20 percent aqueous solution of DMA and NMA was prepared which contained 19.4 percent DMA and 0.6 percent NMA. Deionized water was utilized in the preparation of this solution. This solution was nitrogen sparged for one minute employing a coarse fritted glass tube. Ammonium persulfate (0.0375 phm) and sodium metabisulfite (0.0375 phm) were employed as 0.5 percent aqueous solutions to initiate this polymerization. The ammonium persulfate/sodium metabisulfite initiator was added while maintaining a nitrogen purge above the solution. The 4 ounce polymerization bottle was capped, vigorously shaken, and allowed to stand at 20° C. in a constant temperature bath for about 18 hours.

An ultra-high molecular weight copolymer of DMA and NMA was formed, which had the consistency of a thick gel. This polymer has excellent properties as an EOR viscosifier for injection water because it is not affected by saline solution (salt does not decrease the viscosity of the injection water that has been made using this copolymer).

EXAMPLE 3

In order to determine the effectiveness of DMA/SSS polymers and DMA/NMA copolymers as viscosifiers for EOR applications the Brookfield viscosity of the dilute solutions of the ultra-high molecular weight copolymers synthesized in Examples 1 and 2 were determined. A 0.3 percent solution of the DMA/SSS copolymer (synthesized in Example 1) and a 0.3 percent solution of the DMA/NMA copolymer (synthesized in Example 2) were prepared by diluting their respective gel-like masses with deionized water. The samples were shaken intermittently over a one week period until the material was totally dissolved in the water. Brookfield viscosities were run at 60 rpm using the number 1 spindle. This procedure was repeated on a separate aliquot adding sufficient NaCl to yield a 3.5% solution and again repeated on another aliquot adding sufficient sea salt to yield a 5.0 percent solution of sea salt. The results of this experiment are shown in Table III.

TABLE III

| Brookfield Viscosity of dilute polymer solutions | | | |
|---|---|---|---|
| Polymer | Salt Free | 3/5% NaCl | 5.0% Sea Salt |
| DMA/NMA | 21.7 | 19.1 | 20.2 |
| DMA/SSS | 25.2 | 16.5 | 17.7 |

The sea salt used in this Example was a synthetic composition composed of 77.76 parts NaCl, 10.88 parts $MgCl_2$, 4.74 parts $MgSO_4$, 3.6 parts $CaSO_4$, 2.46 parts KCl, 0.24 parts KBr, and 0.34 parts $CaCO_3$.

As can be determined by examining Table III, the copolymer of DMA and SSS was only slightly affected by the saline solution which is exemplified by the slight decrease in viscosity that was observed upon addition of salt. The decrease in viscosity in the solution of the copolymer of DMA and NMA was insignificant. Solutions of this DMA/NMA copolymer are unaffected by saline solutions; the slight decrease in viscosity that was observed can be attributed to further dilution of the polymer solution by addition of the salt rather than the sensitivity of the ultra-high molecular weight polymer to the salt. DMA/NMA copolymers are superior as injection water viscosifiers for use in high salinity environments.

EXAMPLE 4

In order to demonstrate the superiority of these DMA copolymers as viscosifiers for high salinity applications they were compared with a commercially available EOR viscosifier, Dow-Pusher 500 TM (Dow Chemical). It is an ultra-high molecular weight partially hydrolyzed polyacrylamide. A 0.3 percent solution of Dow-Pusher 500 TM was prepared an synthetic sea salt composition described in Example 3 was added to give a salt concentration of 5 percent. The Brookfield viscosity of this solution was determined using the technique described in Example 3. The Dow-Pusher 500 TM provided a Brookfield viscosity of 0.1 cps. The Brookfield viscosity determined for the same concentration of the DMA/NMA copolymer in the same sea salt solution was twice as high (see Example 3). Since in practice salts are often present in injection water and the subterranean regions where this water is injected, these ultra-high molecular weights DMA copolymers offer a very distinct advantage over present injection water viscosifiers.

EXAMPLE 5

Na-AMS was prepared by the stoichiometric addition of AMS powder to a NaOH solution. The pH of this solution was adjusted to between 9 and 10 by the addition of AMS or dilute NaOH; this solution was diluted with deionized water to yield a 20 weight percent solution. This solution was kept at a temperature between 5° and 15° C. during the reaction and the pH of this solution was maintained above 9. AMS was added until the pH of the solution reached 9. More sodium hydroxide could have been added to keep the pH above 9 and allow for the addition of more AMS. The reaction product of this procedure was sodium-AMS and water.

1.2 grams of a 14.3 percent solution of NMA in DMA was added to a 8 dram (29.57 ml.) glass vial followed the addition of 1.92 grams of a 50 percent aqueous solution of Na-AMS (prepared using the procedure described above). This solution was further diluted to 10 grams total weight (the total weight of the water and monomers in the solution) with deionized water to obtain a 20 percent monomer concentration. The solution was nitrogen sparged for a period of 4 minutes while the vial was immersed in a 0° C. constant temperature bath. 0.1 ml. (milliliters)of a 0.5 percent solution of ammonium persulfate was added. This was followed by the addition of 0.1 milliliters of a 0.5 percent solution of sodium metabisulfite. The vial was capped, shaken and placed in a 10° C. constant temperature bath for a period of 18 hours. This polymerization yields an ultra-high molecular weight DMA terpolymer where the polymerization mass has a gel-like consistency.

Aliquots of this polymerization mass were diluted to concentrations of 0.25 percent in salt free water and salt water of varying concentrations. The Brookfield viscosity for these solutions was determined using the technique described in Example 3. The Brookfield viscosity for these solutions is shown in Table IV.

TABLE IV

| EFFECT OF SALT ON THE VISCOSITY OF DMA/Na—AMS/NMA Terpolymers | |
|---|---|
| Salt Concentration (ppm) | Brookfield Viscosity (cps) |
| 0 | 4820.0 |
| 1000 | 295.0 |
| 5000 | 59.0 |
| 10000 | 43.0 |
| 20000 | 30.5 |
| 50000 | 26.5 |
| 100000 | 23.3 |

The salt composition used in this Example had a composition of 75 percent sodium chloride and 25 percent calcium chloride. As is readily apparent from examining Table II, this terpolymer has an ultra-high viscosity in fresh water and very respectable viscosity in high salinity water. It has excellent characteristics as a general purpose viscosifier suitable for use in both fresh and high salinity water. It also has excellent thermal stability and stability in the presence of divalent ions (in the presence of $Ca++$ ions there is no precipitation).

EXAMPLE 6

The procedure specified in Example 5 was utilized to synthesize a terpolymer of DMA, NMA, and K-AMS except that potassium hydroxide was substituted for the sodium hydroxide. The Brookfield viscosity for the solution that was prepared was determined in the same manner that was specified in Example 3. A Brookfield viscosity of 20.5 cps was observed at a concentration of 0.25 percent of this terpolymer in a 10 percent aqueous sodium chloride solution. This proves that K-AMS can be substituted for Na-AMS with great success to produce terpolymers of DMA that are very useful as EOR viscosifiers.

EXAMPLE 7

Using the process described in Example 6 ammonium hydroxide was substituted for potassium hydroxide to form a terpolymer of DMA, NMA and ammonium-AMS. Using the process described in Example 3 the Brookfield viscosity for this terpolymer in a 10 percent salt solution (75 parts NaCl and 25 parts $CaCl_2$) was determined to be 11.0 cps. This is an excellent viscosity for a solution that is this high in salinity.

EXAMPLE 8

120 grams of a 33 percent solution of DMA in deionized water was added to an 8 ounce polymerization bottle fitted with a self-sealing gasket and Teflon TM liner (Teflon is a trademark of duPont). 3.33 grams of a 48 percent solution of NMA in deionized water was added to the solution and was nitrogen sparged for 10 minutes. 60 milliliters of a 6 percent solution of Igepal CO-430 (dispersing agent) in hexane solution (previously nitrogen sparged) was added under a nitrogen atmosphere. This mixture was vigorously agitated. 4.4 milliliters of a 0.5 percent aqueous solution of ammonium persulfate was added by injection with a syringe, followed by 4.4 milliliters of a 0.5 percent aqueous solution of sodium metabisulfite. This polymerization was terminated after six hours by the addition of 2 milliliters of a 2 percent aqueous solution of methylether hydroquinone.

The Brookfield viscosity of a 0.25 percent aqueous solution of this polymer was determined to be 16 cps in a 10 percent salt solution (75 parts NaCl and 25 parts $CaCl_2$) by the method described in Example 3. The product formed in this water-in-oil dispersion polymerization of DMA and NMA is a liquid which can easily be further diluted in water to form a homogeneous solution. This is in contrast to the thick gel-like material that is formed in aqueous polymerization of DMA/NMA copolymers, which require long time periods in order to be further diluted with additional water. In practice, it is contemplated that water-in-oil dispersion polymerization will be employed since it will be necessary to further dilute these polymers in injection water for EOR applications.

EXAMPLE 9

38 grams of a 33 percent aqueous solution of DMA in deionized water was added to an 8 ounce (236.6 ml.) polymerization bottle fitted with a self-sealing gasket and Teflon TM liner. 0.125 grams of SSS was added to this solution and was nitrogen sparged for 10 minutes. 12.5 grams of a 6 percent solution of Igepal CO-430 in hexane, which was previously nitrogen sparged, was added under a nitrogen atmosphere. 0.8 milliliters of a 1.0 percent aqueous solution of ammonium persulfate was added by injection with a syringe. This was followed by the addition of 0.8 milliliters of a 1.0 percent aqueous solution of sodium metabisulfite. This mixture was vigorously agitated. This polymerization was terminated after 6 hours by the addition of 2 milliliters of methylether hydroquinone solution. The product of this polymerization was a liquid. The Brookfield viscosity of a 0.25 percent aqueous solution of this DMA/SSS copolymer was determined to be 16 cps by the technique described in Example 3.

The polymers described herein can find broad application for enhancing the recovery of tertiary oil. Many processes are known in the art for utilizing polymers in such recovery. For example, the polymeric injection water viscosifiers described in this invention can be used as mobility buffers in conventional EOR techniques, such as chemical, miscible and steam. These polymers generally can also be used for reservoir profile improvement through selective adsorption and/or gelation. These techniques are described in more detail in H. K. van Poollen, *Fundamentals of Enhanced Oil Recovery*, (Tulsa, Okla., PennWell Books, 1980), which is incorporated herein by reference in its entirety.

The reaction scheme illustrated below can be utilized in the synthesis of DMA.

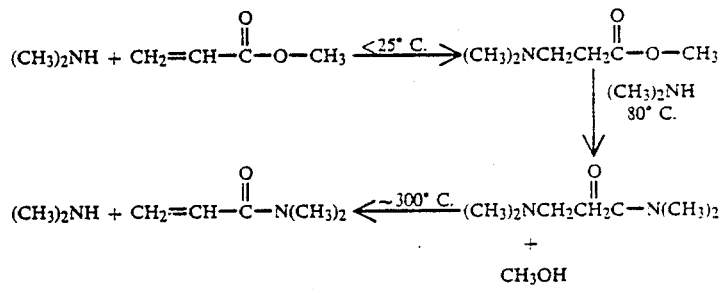

The first step of this reaction scheme is a Michael addition reaction of dimethylamine with methyl acrylate. This reaction is very fast and cooling is generally applied to keep the reaction temperature below 25° C. Low temperatures are desirable in this step in order to minimize any polymerization of the methyl acrylate. Temperatures between 15° C. and 25° C. have proven to be very satisfactory. It is generally preferred for a polymerization inhibitor, such as p-methoxyphenol, to be utilized in order to further limit polymerization during the Michael addition reaction. Glycerin is an excellent solvent for use in this step since it also acts as a catalyst.

The second step in the reaction scheme is an ammonolysis reaction. In this step $(CH_3)_2NCH_2CO_2CH_3$ formed in the first step is reacted with additional dimethylamine to form $(CH_3)_2NCH_2CH_2CON(CH_3)_2$.

This ammonolysis reaction can be conducted at a temperature of 70° C. to 90° C. until a high conversion is achieved.

The third step in the process is a cracking step wherein (CH$_3$)$_2$NCH$_2$CH$_2$CON(CH$_3$)$_2$ is cracked into dimethylamine and DMA. This cracking can be done at a temperature of about 300° C. in a cracking column containing acidic silica. The DMA produced in this process can then be polymerized into high molecular weight water soluble polymers.

While certain representative embodiments and details have been shown for purposes of illustrating the invention, it will be apparent to those skilled in the art that various changes and modifications may be made therein without departing from the scope of the invention. Unless specifically indicated otherwise, parts and percentages are given by weight.

I claim:

1. A high molecular weight water soluble polymer comprised of chain linkages derived from N,N-dimethylacrylamide and at least one member selected from the group consisting of N-methylolacrylamide and sodium styrene sulfonate having a molecular weight above about 1,000,000, wherein said water soluble polymer has at least 30 weight percent of its chain linkages being derived from N-N-dimethylacrylamide and from 0.1 to 5 weight percent of its chain linkages being derived from at least one member selected from the group consisting of N-methylolacrylamide and sodium styrene sulfonate.

2. A high molecular weight water soluble polymer as specified in claim 1 wherein said member selected from the group consisting of N-methylolacrylamide and sodium styrene sulfonate is N-methylolacrylamide.

3. A high molecular weight water soluble polymer as specified in claim 2 wherein from about 1 to 3 weight percent of its chain linkages are derived from N-methylolacrylamide.

4. A high molecular weight water soluble polymer as specified in claim 1 wherein said member selected from the group consisting of N-methylolacrylamide and sodium styrene sulfonate is sodium styrene sulfonate.

5. A high molecular weight water soluble polymer as specified in claim 4 wherein from about 0.5 to about 1.5 weight percent of said polymers chain linkages are derived from sodium styrene sulfonate.

6. A process for the synthesis of a high molecular weight water soluble polymer by an aqueous polymerization which comprises initiating said polymerization with a metal persulfate and at least one member selected from the group consisting of sodium metabisulfite, sodium thiosulfate, and sodium dithionite; wherein said polymerization is conducted in an aqueous reaction mixture which is comprised of (a) water, (b) N,N-dimethylacrylamide, (c) at least one member selected from the group consisting of N-methylolacrylamide and sodium styrene sulfonate, (d) said metal persulfate, and (e) said members selected from the group consisting of sodium metabisulfite, sodium thiosulfate, and sodium dithionite; and wherein the high molecular weight water soluble polymer produced has at least 30 weight percent of its chain linkages being derived from N,N-dimethylacrylamide and from 0.1 to 5 weight percent of its chain linkages being derived from at least one member selected from the group consisting of N-methylolacrylamide and sodium styrene sulfonate.

7. A process as specified in claim 6 wherein the total concentration in said reaction mixture of said N,N-dimethylacrylamide and at least one member selected from the group consisting of N-methylolacrylamide and sodium styrene sulfonate is from 2 weight percent to 50 weight percent and wherein said polymerization is conducted at a temperature of from 5° C. to 50° C.

8. A process as specified in claim 7 wherein the level of said metal persulfate present in said reaction mixture is from 0.01 phm to 0.1 phm; wherein the total level of said members selected from the group consisting of sodium metabisulfite, sodium thiosulfite, and sodium dithionite present in said reaction mixture is from 0.01 phm to 0.1 phm; and wherein said metal persulfate is ammonium persulfate.

9. A process as specified in claim 8 wherein said reaction mixture further comprises an oil and a dispersing agent.

10. A process as specified in claim 8 wherein the total concentration in said reaction mixture of said N,N-dimethylacrylamide and at least one member selected from the group consisting of N-methylolacrylamide and sodium styrene sulfonate is from 10 weight percent to 20 weight percent; wherein said polymerization is conducted at a temperature of from 15° C. to 25° C.; and wherein said polymerization is conducted for a period of 6 to 18 hours.

11. A process as specified in claim 9 wherein said oil is a member selected from the group consisting of kerosene, diesel fuel, and hexane: and wherein said dispersing agent is a nonionic surfactant that is insoluble in water and soluble in hydrocarbons.

12. An aqueous polymer solution comprising: water and a high molecular weight water soluble polymer comprised of chain linkages derived from N,N-dimethylacrylamide and at least one member selected from the group consisting of N-methylolacrylamide and sodium styrene sulfonate having a molecular weight above about 1,000,000, wherein said water soluble polymer has at least 30 weight percent of its chain linkages being derived from N,N-dimethylacrylamide and from 0.1 to 5 weight percent of its chain linkages being derived from at least one member selected from the group consisting of N-methylolacrylamide and sodium styrene sulfonate.

13. An aqueous polymer solution as specified in claim wherein a sufficient amount of said water soluble polymer is dissolved in said water to increase the Brookfield viscosity of said aqueous polymer solution to between 2 cps and 30 cps.

14. A high molecular weight water soluble polymer as specified in claim 13 wherein said member selected from the group consisting of N-methylolacrylamide and sodium styrene sulfonate is N-methylolacrylamide.

15. A high molecular weight water soluble polymer as specified in claim 13 said member selected from the group consisting of N-methylolacrylamide and sodium styrene sulfonate is sodium styrene sulfonate.

16. A high molecular weight water soluble polymer as specified in claim 14 wherein from about 1 to 3 weight percent of its chain linkages are derived from N-methylolacrylamide.

17. A high molecular weight water soluble polymer as specified in claim 15 wherein from about 0.5 to about 1.5 weight percent of said polymers chain linkages are derived from sodium styrene sulfonate.

18. A high molecular weight water soluble polymer comprised of chain linkages derived from N,N-dimethylacrylamide; at least one member selected from the group consisting of N-methylolacrylamide and sodium styrene sulfonate; and at least one member selected from the group consisting of sodium 2-acrylamido-2-methylpropanesulfonate, potassium 2-acrylamido-2-methylpropanesulfonate, ammonium 2-acrylamido-2-methylpropanesulfonate, and calcium 2-acrylamido-2-methylpropanesulfonate; wherein said water soluble polymer has from about 30 to 95 weight percent of its chain linkages being derived from N,N-dimethylacrylamide: wherein said water soluble polymer has from about 4 to 50 weight percent of its chain linkages being derived from at least one member selected from the group consisting of sodium 2-acrylamido-2-methylpropanesulfonate, potassium 2-acrylamido-2-methylpropanesulfonate, ammonium 2-acrylamido-2-methylpropanesulfonate, and calcium 2-acrylamido-2-methylpropanesulfonate; wherein said water-soluble polymer has from at least about 0.1 weight per cent of its chain linkages being derived from at least one member selected from the group consisting of N-methylol acrylamide and sodium styrene sulfonate and wherein said water soluble polymer has a molecular weight of about about 1,000,000.

19. A high molecular weight water soluble polymer as specified in claim 18 wherein said member selected from the group consisting of N-methylolacrylamide and sodium styrene sulfonate is N-methylolacrylamide and wherein from about 0.1 weight percent to 10 weight percent of said water soluble polymers chain linkages are derived from N-methylolacrylamide.

20. A high molecular weight water soluble polymer comprised of chain linkages derived from a major amount of N,N-dimethylacrylamide and from 0.1 to 5 weight percent of at least one member selected from the group consisting of N-methylolacrylamide and sodium styrene sulfonate having a molecular weight above about 1,000,000.

21. A high molecular weight water soluble polymer as specified in claim 20 wherein said member selected from the group consisting of N-methylolacrylamide and sodium styrene sulfonate is N-methylolacrylamide.

22. A high molecular weight water soluble polymer as specified in claim 21 wherein from about 1 to 3 weight percent of its chain linkages are derived from N-methyoloacrylamide.

23. A high molecular weight water soluble polymer as specified in claim 20 wherein said member selected from the group consisting of N-methylolacrylamide and sodium styrene sulfonate is sodium styrene sulfonate and wherein from about 0.5 to about 1.5 weight percent of said polymers chain linkages are derived from sodium styrene sulfonate.

24. An aqueous polymer solution comprising: water and a high molecular weight water soluble polymer comprised of chain linkages derived from a major amount of N,N-dimethylacrylamide and from 0.1 to 5 weight percent of at least one member selected from the group consisting of N-methylolacryolamide and sodium styrene sulfonate having a molecular weight above about 1,000,000.

25. An aqueous polymer solution as specified in claim 24 wherein a sufficient amount of said water soluble polymer is dissolved in said water to increase the Brookfield viscosity of said aqueous polymer solution to between 2 cps and 30 cps.

26. A high molecular weight water soluble polymer comprised of chain linkages derived from a major amount of N,N-dimethylacrylamide; at least one member selected from the group consisting of N-methylolacrylamide and sodium styrene sulfonate; and at least one member selected from the group consisting of sodium 2-acrylamido-2-methylpropanesulfonate, potassium 2-acrylamido-2-methylpropanesulfonate, ammonium 2-acrylamido-2-methylpropanesulfonate, and calcium 2-acrylamido-2-methylpropanesulfonate; wherein said water soluble polymer has from about 4 to 50 weight percent of its chain linkages being derived from at least one member selected from the group consisting of sodium 2-acrylamido-2-methylpropanesulfonate, potassium 2-acrylamido-2-methylpropanesulfonate, ammonium 2-acrylamido-2-methylpropanesulfonate, and calcium 2-acrylamido-2-methylpropanesulfonate; and calcium 2-acrylamido-2-methylpropanesulfonate; wherein said water-soluble polymer has from at least about 0.1 weight per cent of its chain linkages being derived from at least one member selected from the group consisting of N-methylol acrylamide and sodium styrene sulfonate and wherein said water soluble polymer has a molecular weight of above about 1,000,000.

27. A high molecular weight water soluble polymer as specified in claim 26 wherein said member selected from the group consisting of N-methylolacrylamide and sodium styrene sulfonate is N-methylolacrylamide and wherein from about 0.1 weight percent to 10 weight percent of water soluble polymers chain linkages are derived from N-methylolacrylamide.

* * * * *